United States Patent
Zenitani et al.

(10) Patent No.: US 10,147,513 B2
(45) Date of Patent: Dec. 4, 2018

(54) PROTON CONDUCTOR

(71) Applicant: PANASONIC INTELLECTUAL PROPERTY MANAGEMENT CO., LTD., Osaka (JP)

(72) Inventors: Yuji Zenitani, Nara (JP); Takashi Nishihara, Osaka (JP); Tetsuya Asano, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/341,686

(22) Filed: Nov. 2, 2016

(65) Prior Publication Data

US 2017/0076832 A1 Mar. 16, 2017

Related U.S. Application Data

(60) Division of application No. 14/469,165, filed on Aug. 26, 2014, now Pat. No. 9,514,855, which is a
(Continued)

(51) Int. Cl.
*H01B 1/02* (2006.01)
*H01B 1/00* (2006.01)
(Continued)

(52) U.S. Cl.
CPC .............. *H01B 1/02* (2013.01); *C01G 25/00* (2013.01); *C01G 25/006* (2013.01); *H01B 1/00* (2013.01);
(Continued)

(58) Field of Classification Search
CPC ...... H01M 8/02; G02F 1/174; C23C 18/1216; H01L 31/03046
(Continued)

(56) References Cited

U.S. PATENT DOCUMENTS

| 7,580,596 B1* | 8/2009 | Meijer | .......... G02F 1/174 |
| | | | 385/2 |
| 2002/0094372 A1* | 7/2002 | Qiu | .......... C23C 18/1216 |
| | | | 427/100 |

(Continued)

FOREIGN PATENT DOCUMENTS

| JP | 2000-302550 A | 10/2000 |
| JP | 2005-336022 A | 12/2005 |

(Continued)

OTHER PUBLICATIONS

K. Shinoda et al., "Determination of Cation Site Occupany of Dopant in Proton Conducting Barium Zirconate by Powder X-ray Diffraction Utilizing Anomalous Dispersion Effect," (2011), 4 pages, with partial English translation.
(Continued)

*Primary Examiner* — Khanh T Nguyen
(74) *Attorney, Agent, or Firm* — McDermott Will & Emery LLP

(57) ABSTRACT

An exemplary proton conductor according to the present disclosure has a perovskite-type crystal structure expressed by the compositional formula $A_aB_{1-x}B'_xO_{3-\delta}$, where A is at least one selected from among group 2 elements; B is a group 4 element or Ce; B' is a group 3 element, a group 13 element, or a lanthanoid element; $0.5 < a \leq 1.0$, $0.0 \leq x \leq 0.5$, and $0.0 \leq \delta < 3$; and the charge of the above compositional formula is deviated from electrical neutrality in a range of $-0.13$ or more but less than $+0.14$.

4 Claims, 2 Drawing Sheets

Related U.S. Application Data continuation of application No. PCT/JP2014/000515, filed on Jan. 31, 2014.

(51) Int. Cl.
   *H01B 1/08* (2006.01)
   *C01G 25/00* (2006.01)
   *H01M 8/124* (2016.01)

(52) U.S. Cl.
   CPC .............. *H01B 1/08* (2013.01); *H01M 8/124* (2013.01); *C01P 2002/34* (2013.01); *C01P 2006/40* (2013.01); *Y02P 70/56* (2015.11)

(58) Field of Classification Search
   USPC ............ 252/62.2; 429/483, 489; 502/4, 302; 385/2; 136/261; 427/100
   See application file for complete search history.

(56) References Cited

U.S. PATENT DOCUMENTS

| | | | |
|---|---|---|---|
| 2003/0124403 | A1 | 7/2003 | Taniguchi |
| 2006/0162767 | A1* | 7/2006 | Mascarenhas .... H01L 31/03046 136/261 |
| 2010/0196767 | A1 | 8/2010 | Sala et al. |
| 2010/0304229 | A1 | 12/2010 | Ito et al. |
| 2015/0099623 | A1 | 4/2015 | Nishihara et al. |
| 2015/0111129 | A1 | 4/2015 | Komori et al. |
| 2015/0221407 | A1 | 8/2015 | Zenitani et al. |

FOREIGN PATENT DOCUMENTS

| | | | | |
|---|---|---|---|---|
| JP | 2007-200690 | * | 8/2007 | .............. H01M 8/02 |
| JP | 2007-257937 | A | 10/2007 | |
| JP | 2008-021466 | A | 1/2008 | |
| JP | 2008-023404 | A | 2/2008 | |
| JP | 2008-130514 | A | 6/2008 | |
| JP | 2008-243627 | A | 10/2008 | |
| JP | 2009-231075 | A | 10/2009 | |
| JP | 2010-529291 | A | 8/2010 | |
| JP | 2011-029149 | A | 2/2011 | |

OTHER PUBLICATIONS

D. Pergolesi et al., "High proton conduction in grain-boundary-free yttrium-doped barium zirconate films grown by pulsed laser deposition," Nature Materials, vol. 9, Oct. 2010, pp. 846-852.
G. Ma et al., "Ionic conduction and nonstoichiometry in BaxCe0.90Y0.1O3-a," Solid State Ionics 110 (1998) pp. 103-110.
International Search Report issued in International Application No. PCT/JP2014/000515 dated Mar. 4, 2014.
Partial English Translation of Form PCT/ISA/237 (Opinion of the Examiner) for PCT/JP2014/000515.
U.S. Non-Final Office Action issued in related U.S. Appl. No. 14/469,316, dated Nov. 5, 2015.
Han et al "Substantial appearance of origin of conductivity decrease in Y-doped BaZrO3 due to Sa-deficiency", RSC Adv., 2014, 4, 31589-31593 (Jul. 2014).
Yamazaki et al "Cation non-stoichiometry in yttrium-doped barium zirconate: phase behavior, microstructure, and protonconductivity", J. Mater. Chem., 2010, 20, 8158-8166 (Aug. 2010).
Han et al "A comprehensive understanding of structure and site occupancy of Yin Y-doped BaZrO3", J. Mater. Chem. A, 2013, 1, 3027-3033 Jan. 2013).
International Search Report issued in International Application No. PCT/JP2014/000352 dated Mar. 4, 2014.
Proton diffusivity in the BaZr0.9Y0.1O32d proton conductor, Braun et al., J Appl Electrochem (2009) 39:471-475.
U.S. Appl. No. 14/469,316, filed Aug. 26, 2014.
U.S. Office Action issued in U.S. Appl. No. 14/469,165 dated Jul. 22, 2015.
U.S. Office Action issued in U.S. Appl. No. 14/469,165 dated Apr. 21, 2016.
U.S. Notice of Allowance issued in U.S. Appl. No. 14/469,165 dated Aug. 26, 2016.
Cabello, G., et al., "Photochecmical synthesis of AZrO3-x thin films (A=Ba, Ca and Sr) and their characterization", ScienceDirect, Ceramics International 40 (2014) pp. 7761-7768.
Communication pursuant to Article 94(3) EPC issued in corresponding European Patent Application No. 14 752 544.8, dated Mar. 28, 2018.

\* cited by examiner

PROTON CONDUCTOR

This application is a Divisional of U.S. patent application Ser. No. 14/469,165, filed on Aug. 26, 2014, which is a continuation of International Application No. PCT/JP2014/000515, filed on Jan. 31, 2014, the contents of which are hereby incorporated by reference.

BACKGROUND

1. Technical Field

The present disclosure relates to a proton conductor. Moreover, the present disclosure relates to various devices having a proton conductor.

2. Description of the Related Art

Among proton conducting solid electrolytes, many perovskite-type proton conductors have been reported which are expressed by the compositional formula $AB_{1-x}B'_xO_{3-\delta}$. Herein, A is an alkaline-earth metal; B is a tetravalent group 4 transition metal element, or Ce, which is a tetravalent lanthanoid element; B' is a trivalent group 3 or group 13 element; and O is oxygen. x is a mole fraction of the B' element with which the B element is substituted, satisfying $0<x<1.0$. $\delta$ is a value representing oxygen deficiencies or oxygen excesses. The fundamental construction of a perovskite structure will later be briefly described with reference to the drawings.

Nature materials Vol 9 (October 2010) 846-852 discloses oxides of a perovskite structure. The oxides described in Nature materials Vol 9 (October 2010) 846-852 have the compositional formula $BaZr_{1-x}Y_xO_{3-\delta}$ or the compositional formula $BaCe_{1-x}Y_xO_{3-\delta}$. In these oxides, A is barium (Ba); B is Zr or Ce; and B' is Y.

Japanese Laid-Open Patent Publication No. 2008-23404 discloses a proton conducting film of a perovskite structure. The proton conducting film described in Japanese Laid-Open Patent Publication No. 2008-23404 has the chemical formula $AL_{1-x}M_xO_{3-\alpha}$. A is an alkaline-earth metal. L is one or more kinds of elements selected from cerium, titanium, zirconium, and hafnium. M is one or more kinds of elements selected from neodymium, gallium, aluminum, yttrium, indium, ytterbium, scandium, gadolinium, samarium, and praseodymium. Herein, X is the mole fraction of an M element with which the L element is substituted, where $\alpha$ is an atomic ratio of oxygen deficiencies. In the proton conducting film described in Japanese Laid-Open Patent Publication No. 2008-23404, $0.05<X<0.35$, and $0.15<\alpha<1.00$.

SUMMARY

One non-limiting, illustrative embodiment of present disclosure provides a perovskite-type proton conductor which has high proton conductivity even in a temperature region of not less than 100° C. and not more than 500° C.

In one general aspect, a proton conductor disclosed herein has a perovskite-type crystal structure expressed by the compositional formula $A_aB_{1-x}B'_xO_{3-\delta}$, where A is at least one selected from among group 2 elements; B is at least one selected from among group 4 elements and Ce; B' is a group 3 element, a group 13 element, or a lanthanoid element; $0.5<a\leq1.0$, $0.0\leq x\leq0.5$, and $0.0\leq\delta<3$; and charge of the compositional formula is deviated from electrical neutrality in a range of −0.13 or more but less than +0.14.

According to a non-limiting, illustrative embodiment of present disclosure, a perovskite-type proton conductor having high proton conductivity can be provided.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Perovskite Structure

Figure 1:
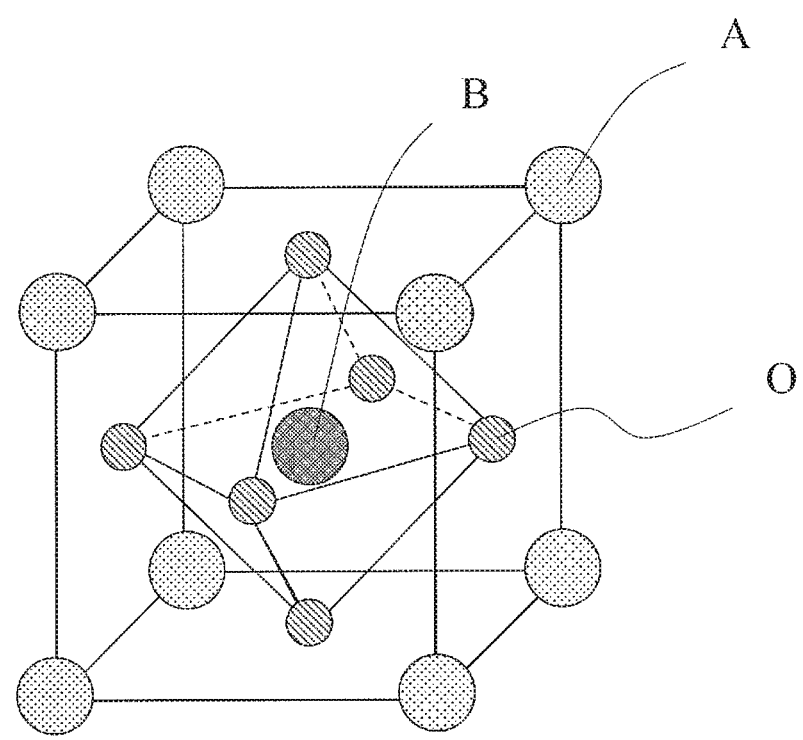
FIG. 1 is a diagram showing a generic perovskite structure expressed by the compositional formula $ABO_3$.

As illustrated in FIG. 1, the generic perovskite structure is composed of elements A, B, and O, and expressed by the compositional formula $ABO_3$. Herein, A is an element which may become a divalent cation; B is an element which may become a tetravalent cation; and O is oxygen. The unit lattice of a crystal having a perovskite structure typically has a near cubic shape. As shown in the figure, ions of element A are located on the eight vertices of the unit lattice. On the other hand, ions of oxygen O are located at the centers of the six faces of the unit lattice. Moreover, an ion of element B is located near the center of the unit lattice. The positions occupied by elements A, B, and O may be called the A site, the B site, and the O site, respectively.

The above structure is the basic structure of a perovskite crystal, in which some of elements A, B, and O may be deficient, excessive, or substituted by other elements. For example, a crystal in which element B' other than element B is located at the B site is a perovskite crystal which is expressed by the compositional formula $AB_{(1-x)}B'_xO_3$. Herein, x is a mole fraction (ratio of the number of atoms) of B', which may be referred to as the substitution ratio. When such substitution, deficiency, or excess of elements occurs, the structure of the unit lattice may distorted or deformed from being a cube. The perovskite crystal is not limited to "cubic", but broadly encompasses any crystal which has undergone a phase transition into the less-symmetric "rhombic" or "tetragonal".

(Findings of the Inventors)

In a conventional proton conductor having a perovskite structure, substituting a tetravalent element B with a trivalent element B' causes oxygen deficiencies in the proton conductor. This is considered because, when some of the tetravalent cations are substituted with trivalent cations, the total positive charge possessed by the cations decreases so that the mole fraction of oxygen ions, which are divalent anions, decreases due to a charge compensation action towards maintaining electrical neutrality, thereby causing oxygen deficiencies. In a proton conductor having such a composition, it is considered that carriers of proton conduction are introduced into the proton conductor as water molecules ($H_2O$) are introduced at the positions (O sites) of oxygen deficiencies.

Conventional proton conductor are considered to exhibit proton conductivity because protons undergo hopping conduction around the oxygen atoms. In this case, temperature dependence of proton conductivity manifests itself in a thermal-activation profile, with an activation energy on the order of 0.4 to 1.0 eV. Therefore, proton conductivity undergoes an exponential decrease with decreasing temperature.

In order for the proton conductor to maintain a high proton conductivity of $10^{-2}$ S/cm (Siemens/centimeter) or more even in the temperature region of not less than 100° C. and not more than 500° C., it is beneficial to ensure that the activation energy concerning proton conductivity is 0.1 eV or less, thereby suppressing any decrease in proton conductivity that is caused by decreasing temperature.

The inventors have tried to create a situation where protons can move more easily than via conventional hopping by increasing the solid solution amount (amount of substitution) of the trivalent element B' so as to increase the concentration or density of proton carriers. However, in a conventional perovskite-type proton conductor, the upper limit of the mole fraction of the B' element is about 0.2, which presents an upper limit to the amount of oxygen deficiencies.

As a method of introducing more proton carriers, the inventors have found that similar effects to increasing the mole fraction of the B' element can be obtained by decreasing the mole fraction of the A element. This allows, as described earlier, more oxygen-deficient sites than conventionally to be provided in the proton conductor. It was also found that the concentration or density of proton carriers can be enhanced, furthermore, by introducing water molecules at the positions of oxygen deficiencies, or introducing protons near oxygens so that the charge of the compositional formula of the perovskite structure is deviated from electrical neutrality. As a result of this, a perovskite-type proton conductor having high proton conductivity was obtained. One implementation of the present disclosure is as follows, in outline.

An proton conductor according to one implementation of the present disclosure is a proton conductor having a perovskite-type crystal structure expressed by the compositional formula $A_aB_{1-x}B'_xO_{3-\delta}$, where A is at least one selected from among group 2 elements; B is at least one selected from among group 4 elements and Ce; B' is a group 3 element, a group 13 element, or a lanthanoid element; $0.5 < a \leq 1.0$, $0.0 \leq x \leq 0.5$, and $0.0 \leq \delta < 3$; and charge of the compositional formula is deviated from electrical neutrality in a range of −0.13 or more but less than +0.14.

A may be at least one selected from the group consisting of Ba, Sr, and Ca; B may be at least one selected from the group consisting of Zr, Ce, and Ti; and B' may be one selected from the group consisting of Yb, Y, Nd, and In.

It may be that x=0, and the charge of the above compositional formula may be deviated from electrical neutrality in a range of more than 0 but less than 0.14.

It may be that $0.0 < x \leq 0.50$, and the charge of the above compositional formula may be deviated from electrical neutrality in a range of −0.13 or more but less than 0.

In one embodiment, the values a, x and δ are determined based on quantitative measurements of elements composing the proton conductor.

In one embodiment, an activation energy of proton conduction in a temperature range of not less than 100° C. and not more than 500° C. is 0.1 eV or less.

Embodiment 1

Hereinafter, embodiments will be described.

The proton conductor of the present disclosure has a perovskite-type crystal structure expressed by the compositional formula $A_aB_{1-x}B'_xO_{3-\delta}$. A is at least one selected from among alkaline-earth metals. B is at least one selected from among group 4 transition metals and Ce. B' is a group 3 or group 13 element. In the above compositional formula, a, x, and δ satisfy $0.5 < a \leq 1.0$, $0.0 \leq x \leq 0.5$, and $0.0 \leq \delta < 3$. Moreover, the charge of the above compositional formula is deviated from electrical neutrality in a range of −0.13 or more but less than +0.14. In other words, the mole fractions a and x, and amount of oxygen deficiencies δ are determined so that the compositional formula $A_aB_{1-x}B'_xO_{3-\delta}$ is not electrically neutral. The crystal composition of the proton conductor itself is electrically neutral; it is considered that, in a manner of compensating the charge of the perovskite-type crystal structure expressed by the compositional formula $A_aB_{1-x}B'_xO_{3-\delta}$, the perovskite-type crystal structure may have protons introduced therein, or an electrical excess of oxygen.

In the present specification, the crystal composition of the proton conductor includes the proton conductor as well as protons, oxygen, or the like that compensate the charge of the perovskite-type crystal structure. Note that the protons, oxygen, or the like that compensate the charge of the perovskite-type crystal structure are located in accordance with the composition, charge condition, etc., of the proton conductor, these protons or oxygen not having been intentionally introduced. Therefore, the proton conductivity of the proton conductor is considered to mainly depend on the composition and charge condition of the proton conductor.

<A Element>

Examples of the A element are group 2 elements (alkaline-earth metals). The A element being a group 2 element stabilizes the perovskite-type structure. Typical examples of the A element are at least one selected from the group consisting of barium (Ba), strontium (Sr), calcium (Ca), and magnesium (Mg). In particular, those proton conductors whose A element is at least one selected from the group consisting of calcium (Ca), barium (Ba), and strontium (Sr) can have high proton conductivity. Moreover, the A element may at least contain barium (Ba) and additionally contain at least one selected from the group consisting of strontium (Sr), calcium (Ca), and magnesium (Mg). For example, the A element is $Ba_yA'_{1-y}$ ($0 < y \leq 1$).

Since the A element is a group 2 element whose valence is divalent, similar effects to increasing the mole fraction of the B' element amount can be obtained by decreasing the amount of the A element, thus making oxygen deficiencies likely to occur. This causes a deviation from electrical neutrality, making it easier for proton carriers to be introduced; thus, an effect of enhancing the proton carrier concentration is obtained.

<B Element>

Examples of the B element are at least one selected from group 4 elements and cerium (Ce). Typical examples of the B element are at least one selected from the group consisting of zirconium (Zr), cerium (Ce), titanium (Ti), and hafnium (Hf). When the B element is zirconium (Zr), the perovskite-type structure will be stable, thus resulting in less production of any structural components not possessing proton conductivity. As a result, proton conductor having high proton conductivity can be obtained.

<B' Element>

Examples of the B' element are group 3 elements, group 13 elements, and trivalent lanthanoid elements. For example, the B' element may have an ion radius greater than 0.5 Å and smaller than 1.02 Å. This allows to keep the perovskite-type structure stable. Thus, while maintaining the crystal structure, oxygen deficiencies are likely to occur, thus permitting stable existence even if the charge of the above compositional formula $A_aB_{1-x}B'_xO_{3-\delta}$ is deviated from electrical neutrality.

Typical examples of the B' element are ytterbium (Yb), neodymium (Nd), yttrium (Y), and indium (In). It is more beneficial that a proton conductor whose B' element is ytterbium (Yb), neodymium (Nd), yttrium (Y), or indium (In) because its perovskite structure is stable and it also has a high proton conductivity.

(a, x, and $\delta$)

The value a, which represents the mole fraction of the A element, is in the range of $0.5 < a \leq 1.0$. When the mole fraction a is 0.5 or less, it is possible to synthesize an oxide having a perovskite structure, but it is difficult to control the charge of the above compositional formula from electrical neutrality, this being not preferable.

When the mole fraction a is greater than 1.0, the oxide will have a phase not exhibiting proton conductivity, thus resulting in a greatly reduced proton conductivity.

The x value, which represents the mole fraction of the B' element, is in the range of $0.0 \leq x \leq 0.5$. The mole fraction x being greater than 0 will cause oxygen deficiencies in the perovskite structure, so that carriers of proton conduction will be introduced into the proton conductor. On the other hand, when the mole fraction x is greater than 0.5, it is possible to synthesize an oxide having a perovskite structure, but a phase not exhibiting proton conductivity will also be produced. This will greatly reduce the proton conductivity of the entire oxide.

In the above compositional formula, A is a divalent element; B is a tetravalent element; B' is a trivalent element; and oxygen is a divalent element. Therefore, the charge of the above compositional formula is determined by the mole fractions a and x and the amount of oxygen deficiencies $\delta$. In terms of electrical neutrality, it is considered that a sum of the amount of A deficiencies, i.e., the value (1−a), and a half amount of the amount of B' substitution defines the amount of oxygen deficiencies. In the proton conductor of the present embodiment, the charge of the above compositional formula is deviated from electrical neutrality in a range of −0.13 or more but less than +0.14. In other words, the mole fractions a and x, and amount of oxygen deficiencies $\delta$ are determined so that the compositional formula $A_aB_{1-x}B'_xO_{3-\delta}$ is not electrically neutral.

For example, when the mole fraction x of B' is 0, the charge of the above compositional formula is deviated from electrical neutrality in a range of more than 0 but less than 0.14. When the mole fraction x of B' is such that $0.0 < x \leq 0.5$, the charge of the above compositional formula is deviated from electrical neutrality in a range of −0.13 or more but less than 0.

When the mole fractions a and x are such that $0.5 < a \leq 1.0$ and $0.0 \leq x \leq 0.5$, a stable oxide having plenty of oxygen deficiencies and having a perovskite structure is obtained. As a result of water molecules or protons being introduced at the positions of these oxygen deficiencies, or the positions of oxygen deficiencies being left vacant, the charge of the above compositional formula is deviated from electrical neutrality in a range of −0.13 or more but less than +0.14. Although the detailed reasons are currently unclear, this presumably realizes a proton conductor which has a high proton carrier concentration, or in which protons are likely to conduct at relatively low temperatures in terms of charge distribution in the crystal structure. According to the present embodiment, a proton conductor having a proton conductivity of about $10^{-1}$ S/cm at a temperature of about 100° C. can be realized.

According to the present disclosure, a proton conductor is realized which has a single-crystalline or polycrystalline perovskite structure composed of a single phase that is substantially uniform (homogeneous) in composition and crystal structure. Herein, being "composed of a single phase which is substantially uniform in composition and crystal structure" means that the proton conductor does not contain any heterophase that has a composition outside the ranges of the present invention. Note that embodiments of the proton conductor of the present disclosure may contain minute amounts of unavoidable impurities. In the case where the proton conductor of the present disclosure is produced by sintering, compounds or elements of sintering aids or the like may be partially contained. Otherwise, in the course of the production process, impurities may be added unintentionally, or intentionally for certain effects. What is important is that the respective elements of A, B, B', and O are within the ranges defined by the present disclosure, these constituting a perovskite crystal structure. Therefore, impurities which might stray in during production may be contained.

(Determination of Compositional Formula and Measurement of Charge of the Compositional Formula)

The compositional formula of the proton conductor of the present embodiment, and a charge deviation from electrical neutrality when it is expressed by the above compositional formula, can be measured by using an electron probe microanalyzer (EPMA), for example. For example, quantitative measurements of elements of the proton conductor as represented by the above compositional formula are taken, and the charge of the above compositional formula is calculated from the valences and mole fractions of the component elements. In an evaluation using the electron probe microanalyzer used for measurement, it is beneficial to take measurements by using a spectroscope of a wavelength dispersion type. In this case, it is beneficial to conduct calibration by using a control sample having a known chemical composition, so that quantitative evaluation is possible. On the other hand, a spectroscope of an energy dispersion type is not preferable because it is prone to large errors in quantitative evaluation of light elements such as oxygen. Moreover, a quantitative analysis by using inductively coupled plasma spectroscopy (ICP) may be able to measure metallic elements composing the material, but not able to quantify the oxygen element; thus, it is not suitable for measuring electrical neutrality deviations.

As the electron probe microanalyzer (EPMA), JXA-8900R manufactured by JEOL Ltd. can be used, for example. For a characteristic X ray which occurs through irradiation of an electron beam, a wavelength dispersive spectroscope (WDS) is used. The characteristic X ray is measured through quantitative measurement, by using a characteristic X ray that has been obtained through calibration with a control sample having a known composition, and using an analyzing crystal. The component element ratio of the proton conductor is analyzed, and a product of the valence and the component element fraction of each component element is calculated. For example, in the perovskite-type crystal structure expressed by the compositional formula $A_aB_{1-x}B'_xO_{3-\delta}$, let it be assumed that A is Ba; B is Zr; and B' is Y. In this case, calculations are to be performed by assuming that Ba has +2 valence; Zr has +4 valence; Y has +3 valence; and O has −2 valence. As the valence of any such element, the most likely valence value in a stable oxide state is to be adopted. Next, assuming that an analysis using EPMA finds that the fraction of A(Ba) is a; the fraction of B(Zr) is b; the fraction of B' (Y) is c; and the fraction of O is d, then the chemical compositional formula can be expressed as $Ba_aZr_bY_cO_d$. The charge of the compositional formula, i.e., deviation from electrical neutrality, can be calculated to be $((2\times a)+(4\times b)+(3\times c)-(2\times d))\div(b+c)$. Through this calculation, a product of the valence of each component element and its component element fraction is taken, and a sum of the values of the respective elements is derived, after which the charge is normalized by utilizing a sum of the component element fractions of B and B' as 1. Since B and B' are unlikely to become deficient because of they are located in the center of an octahedron which is surrounded by oxygens in the perovskite-type structure, a normalization based on a sum of B and B' is applied to ascertain a deviation of charge from electrical neutrality per unit cell (unit lattice).

It is beneficial that the ion conductor to be analyzed has a flat surface because, if there were significant rises and falls, characteristic X rays occurring from within the sample upon electron beam irradiation would not be correctly detected, thus making quantitative measurement difficult. Moreover, since proton conductors have poor electrical conductivity, carbon or the like may be thinly vapor-deposited on the surface to prevent charging with an incident electron beam. There is no particular limitation as to the incidence condition of the electron beam for observation, so long as a sufficient signal intensity is obtained at the WDS, and as the sample is not be degraded via burning or the like caused by incidence of the electron beam. As for the measuring points, it is beneficial to conduct measurement at five or more points and adopt an average value thereof. Among the five or more measuring points, it is beneficial that any measurement value which is clearly distant from the other measurement values is not adopted as a value for average value calculation.

(Production Method)

The proton conductor of the present embodiment can be implemented in various forms. In order to obtain a film of proton conductor, it can be produced by a film formation method such as a sputtering technique, a pulsed laser deposition technique (PLD technique), or a chemical vapor deposition technique (CVD technique). Adjustment of the composition is achieved by commonly-used techniques used in such film formation methods. For example, in the case of a sputtering technique or a pulsed laser deposition technique, the target composition may be adjusted to control the composition of the proton conductor that is produced. In the case of a chemical vapor deposition technique, the amount of source gas to be introduced into the reaction chamber may be adjusted to control the composition of the proton conductor that is produced.

In order to obtain a proton conductor in bulk state, it can be synthesized by a solid phase reaction technique, a hydrothermal synthesis method, or the like.

In order to adjust for a charge deviation from electrical neutrality when the proton conductor of the present embodiment is expressed by the above compositional formula, the molar ratio between the component elements under the aforementioned production methods may be controlled, or a heat treatment in a reducing atmosphere may follow synthesis to achieve control.

(Others)

Proton conductors are also referred to as called proton conducting solid electrolytes. A proton conductor does not need to be a continuous film or in bulk form, so long as it functions to conduct protons.

In the case where the proton conductor is implemented in film form, the surface of the base substrate on which the proton conductor is supported does not need to be flat. In order to prevent direct reaction between the gas which is the source material that supplies protons to the proton conductor of the present embodiment and the gas that reacts with the protons having been conducted through the proton conductor or the hydrogen which is the reduced form of protons, it is beneficial that there is no leakage between the flow paths of these two gases. To this end, for example, a thin film of the perovskite-type proton conductor of the present embodiment may be formed on a base substrate which is composed of magnesium oxide (MgO), strontium titanate ($SrTiO_3$), silicon (Si), or the like, this base substrate having a smooth plane. Thereafter, a part or a whole of the base substrate may be removed by using etching or the like, thus partially exposing the surface of the proton conductor through the base substrate for supplying gases. There is no particular limitation as to the material and shape of the base substrate.

The crystal structure of the proton conductor may be single-crystalline or polycrystalline, as described above. A proton conductor having oriented crystal structure by controlling the orientation of crystal growth on a substrate of magnesium oxide (MgO) or strontium titanate ($SrTiO_3$), or on a silicon (Si) substrate having a buffer layer with a controlled lattice constant formed thereon, can have a higher proton conductivity. A proton conductor having single-crystalline structure which is epitaxially grown on a substrate can have a higher proton conductivity. The proton conductor can acquire a single-crystalline structure through control of the film-formation conditions such as the surface orientation of the substrate, temperature, pressure, and the atmosphere, for example. There is no particular limitation as to the conditions for obtaining a single-crystalline structure and the crystal growth direction or orientation direction of the single-crystalline structure.

(Device Applications)

Figure 3:
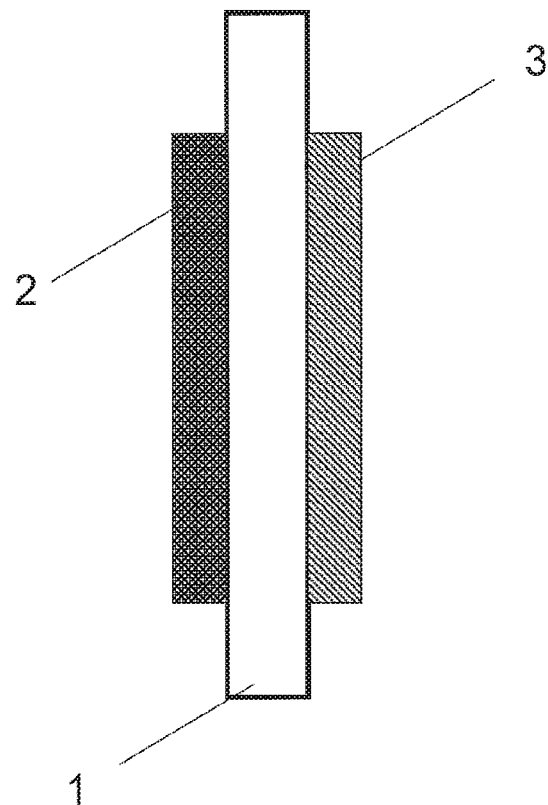
FIG. 3 is a cross-sectional view showing an exemplary device including a proton conductor.

By using the proton conductor of the present disclosure for a known device, a device having high proton conduction can be provided. FIG. 3 shows an exemplary device including the proton conductor. The device shown in FIG. 3 includes a proton conductor 1, an anode electrode 2, and a cathode electrode 3. Examples of known devices are fuel cells, hydrogen sensors, water vapor electrolytic devices, and hydrogenation devices.

EXAMPLES

Hereinafter, the present disclosure will be specifically described by way of Examples.

Example 1

A base substrate (10 mm×10 mm, thickness 0.5 mm) was set on a substrate holder within a vacuum chamber, the substrate holder having a heating mechanism, and the inside of the vacuum chamber was evacuated to a degree of vacuum of about $10^{-3}$ Pa. The material of the base substrate was single-crystalline magnesium oxide (MgO).

After evacuating the inside of the vacuum chamber, the base substrate was heated at 650° C. to 750° C. An oxygen gas (flow rate: 2 sccm) and an argon gas (flow rate: 8 sccm) were introduced, and the pressure inside the vacuum chamber was adjusted to about 1 Pa.

By using a sintered target having an element ratio of Ba:Zr=1:1, a proton conductor was formed into a film by a sputtering technique. The resultant proton conductor had a thickness of 500 nm, and a size of 10 mm×10 mm.

The structure, mole fractions, and proton conductivity of the resultant film of proton conductor were evaluated. Moreover, the charge deviation and the activation energy of proton conduction were determined. Results are shown in Table 1. Hereinafter, the respective evaluation methods and the results thereof will be described.

By using a Cu target, an X-ray diffraction of the proton conductor produced was measured. It was confirmed that the resultant proton conductor had a perovskite-type crystal structure.

The compositional formula and the charge of the compositional formula of the proton conductor produced were measured by the aforementioned EMPA. As shown in Table 1, in the compositional formula of the proton conductor ($A_aBO_{3-\delta}$), the A element was barium (Ba) and the a value was 0.904 assuming that the B element of zirconium was 1. Moreover, the oxygen amount ($3-\delta$) was 2.876, and the charge of the compositional formula was deviated from electrical neutrality by 0.056 toward the positive side.

Figure 2:
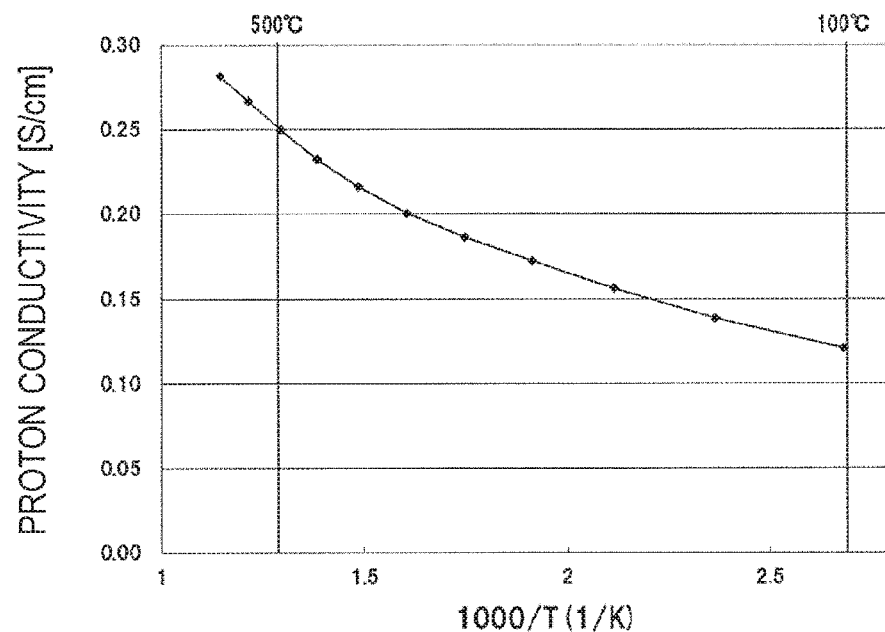
FIG. 2 is a diagram showing proton conductivity in a temperature range from 100° C. to 600° C. according to Example 1.

An electrode was formed by using silver paste on the proton conductor. In an argon (Ar) gas in which 5% hydrogen ($H_2$) was mixed, under a temperature-range condition from 100° C. to 600° C., proton conductivity was measured by using an impedance method. Temperature dependence of proton conductivity is shown in FIG. 2.

As shown in Table 1, the proton conductivity at 100° C. was 0.12 S/cm, and the proton conductivity at 500° C. was 0.25 S/cm. The activation energy of proton conduction was determined to be 0.041 eV.

Example 2

An experiment was conducted similarly to Example 1 except that a film was formed by using a sintered target having an element ratio of Ba:Zr:Ce:Nd=10:5:4:1. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba); the a value was 0.975; the B element was zirconium (Zr) and cerium (Ce), their respective values being 0.495 and 0.412. The B' element was neodymium (Nd), with an x value of 0.099. The oxygen amount ($3-\delta$) was 2.975, and it was found that, given the tetravalence of Ce, the charge of the compositional formula was deviated from electrical neutrality by 0.099 toward the negative side. As shown in Table 1, the proton conductivity at 100° C. was 0.33 S/cm, and the proton conductivity at 500° C. was 0.48 S/cm. The activation energy of proton conduction was determined to be 0.022 eV.

Example 3

An experiment was conducted similarly to Example 1 except that a film was formed by using a sintered target having an element ratio of Ba:Zr:Y=2:1:1. Table 1 shows the structure, mole fractions, and proton conductivity of the resultant film of proton conductor.

It was confirmed that the proton conductor had a perovskite-type crystal structure and was polycrystalline. As shown in Table 1, in the proton conductor ($A_aB_{1-x}B'_xO_{3-\delta}$), the A element was barium (Ba); the a value was 0.539; the B element was zirconium (Zr); and the B' element was yttrium (Y), with an x value of 0.48 (Zr:0.52, Y:0.48). The oxygen amount was 2.363, and it was found that, given the tetravalence of Ce, the charge of the compositional formula was deviated from electrical neutrality by 0.128 toward the negative side. As shown in Table 1, the proton conductivity at 100° C. was 0.39 S/cm, and the proton conductivity at 500° C. was 0.71 S/cm. The activation energy of proton conduction was determined to be 0.035 eV.

Example 4

An experiment was conducted similarly to Example 1 except that a film was formed by using a sintered target having an element ratio of Ba:Zr:Ti:In=6:7:1:2. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba); the a value was 0.522; the B element was zirconium (Zr) and titanium (Ti), with zirconium being 0.682 and titanium being 0.098. Moreover, the oxygen amount was 2.474, and it was found that the charge of the compositional formula was deviated from electrical neutrality by 0.124 toward the negative side. The B' element was indium (In), with an x value of 0.22. As shown in Table 1, the proton conductivity at 100° C. was 0.34 S/cm, and the proton conductivity at 500° C. was 0.67 S/cm. The activation energy of proton conduction was determined to be 0.037 eV.

Example 5

Barium carbonate ($BaCO_3$), zirconium dioxide ($ZrO_2$), and yttrium oxide ($Y_2O_3$) were weighed and mixed, and prebaked at about 1300° C. and thereafter baked at 1700° C., whereby a bulk sample of ceramic was produced so as to attain an element ratio of Ba:Zr:Y=5:4:1. Except for using the bulk body of ceramic, an experiment was conducted similarly to Example 1. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba); the a value was 0.966; the B element was zirconium (Zr); and the B' element was yttrium (Y), with an x value of 0.197. Moreover, the oxygen amount was 2.932, and it was found that the charge of the compositional formula was deviated from electrical neutrality by 0.129 toward the negative side. As shown in Table 1, the proton conductivity at 100° C. was 0.37 S/cm, and the proton conductivity at 500° C. was 0.78 S/cm. The activation energy of proton conduction was determined to be 0.039 eV.

Example 6

An experiment was conducted similarly to Example 1 except that a film was formed by using a sintered target having an element ratio of Sr:Zr=1:1. Table 1 shows the structure, mole fractions, and proton conductivity of the resultant film of proton conductor.

It was confirmed that the proton conductor had a perovskite-type crystal structure. As shown in Table 1, in the proton conductor ($A_aBO_{3-\delta}$), the A element was strontium (Sr), with an a value of 0.98. Moreover, the oxygen amount was 2.969, and it was found that the charge of the compositional formula was deviated from electrical neutrality by 0.022 toward the positive side. As shown in Table 1, the proton conductivity at 100° C. was 0.10 S/cm, and the proton conductivity at 500° C. was 0.21 S/cm. The activation energy of proton conduction was determined to be 0.055 eV.

Example 7

An experiment was conducted similarly to Example 1 except that a film was formed by using a sintered target having an element ratio of Sr:Zr:Yb=10:7:3. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was strontium (Sr), with an a value of 0.965. The B element was zirconium (Zr); and the B' element was ytterbium (Yb), with an x value of 0.05. Moreover, the oxygen amount was 2.955, and it was found that the charge of the compositional formula was deviated from electrical neutrality by 0.03 toward the negative side. As shown in Table 1, the proton conductivity at 100° C. was 0.10 S/cm, and the proton conductivity at 500° C. was 0.22 S/cm. The activation energy of proton conduction was determined to be 0.055 eV.

Example 8

An experiment was conducted similarly to Example 1 except that a film was formed by using a sintered target having an element ratio of Sr:Zr:Ce:Y=8:4:3:3. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was strontium (Sr), with an a value of 0.736. The B element was zirconium (Zr) and cerium (Ce), with zirconium being 0.423 and cerium being 0.307. The B' element was yttrium (Y), with an x value of 0.27. Moreover, the oxygen amount was 2.616, and it was found that the charge of the compositional formula was deviated from electrical neutrality by 0.03 toward the negative side. As shown in Table 1, the proton conductivity at 100° C. was 0.13 S/cm, and the proton conductivity at 500° C. was 0.25 S/cm. The activation energy of proton conduction was determined to be 0.042 eV.

Example 9

An experiment was conducted similarly to Example 1 except that a film was formed by using a sintered target having an element ratio of Sr:Zr:In=7:6:4. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was strontium (Sr), with an a value of 0.686. The B element was zirconium (Zr); and the B' element was indium (In), with an x value of 0.351. Moreover, the oxygen amount was 2.542, and it was found that the charge of the compositional formula was deviated from electrical neutrality by 0.063 toward the negative side. As shown in Table 1, the proton conductivity at 100° C. was 0.13 S/cm, and the proton conductivity at 500° C. was 0.24 S/cm. The activation energy of proton conduction was determined to be 0.041 eV.

Example 10

An experiment was conducted similarly to Example 1 except that a film was formed by using a sintered target having an element ratio of Sr:Zr:Y=3:3:2. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was strontium (Sr), with an a value of 0.563. The B element was zirconium (Zr); and the B' element was yttrium (Y), with an x value of 0.474. Moreover, the oxygen amount was 2.358, and it was found that the charge of the compositional formula was deviated from electrical neutrality by 0.063 toward the negative side. As shown in Table 1, the proton conductivity at 100° C. was 0.18 S/cm, and the proton conductivity at 500° C. was 0.30 S/cm. The activation energy of proton conduction was determined to be 0.025 eV.

Example 11

An experiment was conducted similarly to Example 1 except that a film was formed by using a sintered target having an element ratio of Ca:Zr=1:1. Table 1 shows the structure, mole fractions, and proton conductivity of the resultant film of proton conductor.

It was confirmed that the proton conductor had a perovskite-type crystal structure. As shown in Table 1, in the proton conductor ($A_aBO_{3-\delta}$), the A element was calcium (Ca), with an a value of 0.987. The oxygen amount was 2.972, and it was found that the charge of the compositional formula was deviated from electrical neutrality by 0.03 toward the positive side. As shown in Table 1, the proton conductivity at 100° C. was 0.02 S/cm, and the proton conductivity at 500° C. was 0.18 S/cm. The activation energy of proton conduction was determined to be 0.055 eV.

Example 12

An experiment was conducted similarly to Example 1 except that a film was formed by using a sintered target having an element ratio of Ca:Zr:Y=10:9:1. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was calcium (Ca), with an a value of 0.95. The B element was zirconium (Zr); and the B' element was yttrium (Y), with an x value of 0.099. Moreover, the oxygen amount was 2.926, and it was found that the charge of the compositional formula was deviated from electrical neutrality by 0.051 toward the negative side. As shown in Table 1, the proton conductivity at 100° C. was 0.030 S/cm, and the proton conductivity at 500° C. was 0.21 S/cm. The activation energy of proton conduction was determined to be 0.055 eV.

Example 13

An experiment was conducted similarly to Example 1 except that a film was formed by using a sintered target having an element ratio of Ba:Sr:Zr:Y=5:5:8:2. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba) and strontium (Sr), with the Ba fraction being 0.39 and the Sr fraction being 0.43, with an a value of 0.92. The B element was zirconium (Zr); and the B' element was yttrium (Y), with an x value of 0.192. Moreover, the oxygen amount was 2.876, and it was found that the charge of the compositional formula was deviated from electrical neutrality by 0.104 toward the negative side. As shown in Table 1, the proton conductivity at 100° C. was 0.290 S/cm, and the proton conductivity at 500° C. was 0.41 S/cm. The activation energy of proton conduction was determined to be 0.021 eV.

Comparative Example 1

An experiment was conducted similarly to Example 1 except that a film was formed by using a sintered target having an element ratio of Ba:Zr:Y=6:7:3. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba), with an a value of 0.603. The B element was zirconium (Zr); and the B' element was yttrium (Y), with an x value of 0.315. Moreover, the oxygen amount was 2.445, and it was found that the charge of the compositional formula was electrically neutral. As shown in Table 1, the proton conductivity at 100° C. was $3.3 \times 10^{-6}$ S/cm, and the proton conductivity at 500° C. was $8.4 \times 10^{-3}$ S/cm. The activation energy of proton conduction was determined to be 0.454 eV.

Comparative Example 2

An experiment was conducted similarly to Example 1 except that a film was formed by using a sintered target having an element ratio of Ba:Zr:Y=7:7:3. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba), with an a value of 0.635. The B element was zirconium (Zr); and the B' element was yttrium (Y), with an x value of 0.318. Moreover, the oxygen amount was 2.55, and it was found that the charge of the compositional formula was deviated from electrical neutrality by 0.148 toward the negative side. As shown in Table 1, the proton conductivity at 100° C. was $6.6 \times 10^{-6}$ S/cm, and the proton conductivity at 500° C. was $9.5 \times 10^{-3}$ S/cm. The activation energy of proton conduction was determined to be 0.419 eV.

Comparative Example 3

An experiment was conducted similarly to Example 1 except that a film was formed by using a sintered target having an element ratio of Ba:Zr:Y=10:9:1. Table 1 shows the structure, mole fractions, and proton conductivity of the resultant film of proton conductor.

It was confirmed that the proton conductor had a perovskite-type crystal structure. As shown in Table 1, in the proton conductor ($A_aB_{1-x}B'_xO_{3-\delta}$), the A element was barium (Ba), with an a value of 1.00. The B element was zirconium (Zr); and the B' element was yttrium (Y), with an x value of 0.101. Moreover, the oxygen amount was 3.051, and it was found that the charge of the compositional formula was deviated from electrical neutrality by 0.203 toward the negative side. As shown in Table 1, the proton conductivity at 100° C. was $4.2 \times 10^{-6}$ S/cm, and the proton conductivity at 500° C. was $8.5 \times 10^{-3}$ S/cm. The activation energy of proton conduction was determined to be 0.436 eV.

TABLE 1

| sample | A element | mole fraction a | B element | B' element | mole fraction x | oxygen amount 3-δ | charge deviation | conductivity (S/cm) 100° C. | conductivity (S/cm) 500° C. | activation energy (eV) |
|---|---|---|---|---|---|---|---|---|---|---|
| Example 1 | Ba | 0.904 | Zr | — | 0 | 2.876 | 0.056 | 0.12 | 0.25 | 0.041 |
| Example 2 | Ba | 0.975 | Zr•Ce | Nd | 0.099 | 2.975 | −0.099 | 0.33 | 0.48 | 0.022 |
| Example 3 | Ba | 0.539 | Zr | Y | 0.48 | 2.363 | −0.128 | 0.39 | 0.71 | 0.035 |
| Example 4 | Ba | 0.522 | Zr•Ti | In | 0.22 | 2.474 | −0.124 | 0.34 | 0.67 | 0.037 |
| Example 5 | Ba | 0.966 | Zr | Y | 0.197 | 2.932 | −0.129 | 0.37 | 0.78 | 0.039 |
| Example 6 | Sr | 0.980 | Zr | — | 0 | 2.969 | 0.022 | 0.10 | 0.21 | 0.055 |
| Example 7 | Sr | 0.965 | Zr | Yb | 0.05 | 2.955 | −0.03 | 0.10 | 0.22 | 0.055 |
| Example 8 | Sr | 0.736 | Zr•Ce | Y | 0.27 | 2.616 | −0.03 | 0.13 | 0.25 | 0.042 |
| Example 9 | Sr | 0.686 | Zr | In | 0.351 | 2.542 | −0.063 | 0.13 | 0.24 | 0.041 |
| Example 10 | Sr | 0.563 | Zr | Y | 0.474 | 2.358 | −0.063 | 0.18 | 0.30 | 0.025 |
| Example 11 | Ca | 0.987 | Zr | Y | 0 | 2.972 | 0.03 | 0.02 | 0.18 | 0.055 |
| Example 12 | Ca | 0.95 | Zr | Y | 0.099 | 2.926 | −0.051 | 0.030 | 0.21 | 0.055 |
| Example 13 | Ba•Sr | 0.92 | Zr | Y | 0.192 | 2.876 | −0.104 | 0.29 | 0.41 | 0.021 |
| Comparative Example 1 | Ba | 0.603 | Zr | Y | 0.315 | 2.445 | 0.00 | $3.3 \times 10^{-6}$ | $8.4 \times 10^{-3}$ | 0.454 |
| Comparative Example 2 | Ba | 0.635 | Zr | Y | 0.318 | 2.55 | −0.148 | $6.6 \times 10^{-6}$ | $9.5 \times 10^{-3}$ | 0.419 |
| Comparative Example 3 | Ba | 1.00 | Zr | Y | 0.101 | 3.051 | −0.203 | $4.2 \times 10^{-6}$ | $8.5 \times 10^{-3}$ | 0.436 |

As shown in Table 1, in the proton conductors of Examples 1 to 13, the mole fractions a and x when assuming a sum of B and B' to be 1 satisfy $0.5 < a \leq 1.0$ and $0.0 \leq x \leq 0.5$. Moreover, in the proton conductors of Examples 1 to 13, the charge of the compositional formula of the elements composing the perovskite structure is deviated from electrical neutrality. Specifically, the charge deviation is within the range from −0.128 to 0.057, and is non-zero. In the case where the B' element is not contained, the charge of the compositional formula is deviated from electrical neutrality in a range of more than 0 but 0.057 or less toward the positive side. In the case where the B' element is contained, the charge of the compositional formula is deviated from electrical neutrality in a range of −0.129 or more but less than 0 toward the negative side.

On the other hand, in the proton conductors of Comparative Examples 1 to 3, the mole fractions a and x are within the range of Examples 1 to 13 described above, but the charge of the compositional formula of the elements composing the perovskite structure is electrically neutral (Comparative Example 1), or deviated further toward the negative side from −0.128.

As shown in Table 1, at 100° C., the proton conductors of Examples 1 to 13 have proton conductivities which are four or more digits higher than those of the proton conductors of Comparative Examples 1 to 3. Also at 500° C., the proton conductors of Examples 1 to 13 have proton conductivities which are ten or more times higher. In other words, in a temperature region of not less than 100° C. and not more than 500° C., the proton conductors of Examples 1 to 13 have high proton conductivities of $10^{-2}$ S/cm or more.

In particular, the proton conductors of Examples 1 to 13 have higher proton conductivities especially at a low temperature of about 100° C. than those of the proton conductors of Comparative Examples. Therefore, Examples 1 to 13 have activation energies of proton conduction which are about one digit smaller than the activation energies of Comparative Examples, being lower than 0.1 eV. On the other hand, the proton conductors of Comparative Examples 1 to 3 have activation energies higher than 0.4 eV. This presumably indicates that, even at temperatures of 100° C. or less, the proton conductors of Examples 1 to 13 have higher proton conductivity than conventionally, without allowing their proton conductivity to drastically decrease.

Thus, it was found from these Examples that the proton conductor of the present embodiment has higher proton conductivity than conventionally because the mole fractions a and x and the charge of its compositional formula are within the aforementioned ranges. It was found that a remarkable improvement in proton conductivity over the conventional level is observed in a temperature range from about 100° C. to about 500° C.

A proton conductor according to the present disclosure is used in devices related to hydrogen energy, e.g., fuel cells, hydrogen sensors, water vapor electrolytic devices, and hydrogenation devices, in a structure where it is interposed between an anode electrode and a cathode electrode, and so on.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

What is claimed is:

1. A proton conductor having a perovskite-type crystal structure expressed by the compositional formula $A_aBO_{3-\delta}$, wherein, A is at least one selected from among group 2 elements;
B is at least one selected from among group 4 elements and Ce;
$0.5<a<1.0$, and $0.0\leq\delta<3$; and
charge of the compositional formula is deviated from electrical neutrality in a range of more than 0 but less than +0.14, where the charge of the compositional formula equals $(2\times a)+4-(2\times(3-\delta))$.

2. The proton conductor of claim 1, wherein,

A is at least one selected from the group consisting of Ba, Sr, and Ca; and
B is at least one selected from the group consisting of Zr, Ce, and Ti.

3. The proton conductor of claim 1, wherein the values a and δ are determined based on quantitative measurements of elements composing the proton conductor.

4. The proton conductor of claim 1, wherein an activation energy of proton conduction in a temperature range of not less than 100° C. and not more than 500° C. is 0.1 eV or less.

* * * * *